(12) United States Patent
Kowada et al.

(10) Patent No.: US 12,253,609 B2
(45) Date of Patent: Mar. 18, 2025

(54) GNSS RECEIVING DEVICE AND GNSS RECEIVING METHOD

(71) Applicant: Furuno Electric Co., Ltd., Nishinomiya (JP)

(72) Inventors: Shinya Kowada, Nishinomiya (JP); Kunihiko Hashimoto, Neyagawa (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 15 days.

(21) Appl. No.: 17/122,423

(22) Filed: Dec. 15, 2020

(65) Prior Publication Data

US 2021/0124059 A1   Apr. 29, 2021

Related U.S. Application Data

(63) Continuation of application No. PCT/JP2019/019018, filed on May 14, 2019.

(30) Foreign Application Priority Data

Jun. 15, 2018 (JP) ................................. 2018-114400

(51) Int. Cl.
G01S 19/22 (2010.01)
G01S 3/50 (2006.01)
G01S 19/21 (2010.01)

(52) U.S. Cl.
CPC ................ *G01S 19/22* (2013.01); *G01S 3/50* (2013.01); *G01S 19/215* (2013.01)

(58) Field of Classification Search
CPC ............................... G01S 19/22; G01S 19/215
See application file for complete search history.

(56) References Cited

U.S. PATENT DOCUMENTS 10,024,973 B1   7/2018  Alexander et al.
10,054,687 B2 *  8/2018  Whitehead ............... H04K 3/90
(Continued)

FOREIGN PATENT DOCUMENTS

EP    2796895 A1 * 10/2014  .......... G01S 19/215
JP    H05196716 A    8/1993
(Continued)

OTHER PUBLICATIONS

Virk, U. et al., "Multi-frequency Power Angular Spectrum Comparison for an Indoor Environment," Proceedings of 2017 11th European Conference on Antennas and Propagation (EUCAP), Mar. 19, 2017, Paris, France, 5 pages.
(Continued)

*Primary Examiner* — Cassi J Galt
(74) *Attorney, Agent, or Firm* — Alleman Hall & Tuttle LLP (57) ABSTRACT

A GNSS receiver includes at least two antennas, a satellite direction acquisition module, an estimation module, and a determination module. A satellite direction acquisition module acquires the direction when viewing the satellite corresponding to the GNSS signal received by the antenna based on the satellite orbit information. The estimation module estimates the arrival direction of the GNSS signal on the basis of the difference in timing when the GNSS signal is received by the plurality of antennas. The determination module compares the direction in which the satellite is viewed from the antenna with the arrival direction estimated by the estimation module to determine whether the GNSS signal received by the antenna is a direct GNSS signal based on a direct wave from the satellite or an NLOS GNSS signal.

14 Claims, 5 Drawing Sheets

(56) References Cited

U.S. PATENT DOCUMENTS

| | | | | |
|---|---|---|---|---|
| 10,162,060 | B2* | 12/2018 | Jaeckle | G01S 19/015 |
| 10,690,777 | B2* | 6/2020 | Overbeck | G01S 19/421 |
| 2013/0271316 | A1 | 10/2013 | Trautenberg et al. | |
| 2014/0292576 | A1* | 10/2014 | Martin | G01S 19/215 |
| | | | | 342/357.59 |
| 2015/0116147 | A1* | 4/2015 | Jaeckle | G01S 19/015 |
| | | | | 342/357.59 |
| 2016/0146944 | A1* | 5/2016 | Geren | H04K 3/65 |
| | | | | 342/357.59 |

FOREIGN PATENT DOCUMENTS

| | | | |
|---|---|---|---|
| JP | H07025609 | A | 5/1995 |
| JP | 2004279183 | A | 10/2004 |
| JP | 2005077376 | A | 3/2005 |
| JP | 2005195347 | A | 7/2005 |
| JP | 2005214746 | A | 8/2005 |
| JP | 2006337280 | A | 12/2006 |
| JP | 2008139255 | A | 6/2008 |
| JP | 2010256301 | A | 11/2010 |
| JP | 2018031744 | A | 3/2018 |

OTHER PUBLICATIONS

European Patent Office, Extended European Search Report Issued in Application No. 19819827.7, Feb. 23, 2022, Germany, 10 pages.

* cited by examiner

GNSS RECEIVING DEVICE AND GNSS RECEIVING METHOD

CROSS-REFERENCE TO RELATED APPLICATION(S)

This application is a continuation of PCT International Application No. PCT/JP2019/019018, which was filed on May 14, 2019, and which claims priority to Japanese Patent Application No. 2018-114400 filed on Jun. 15, 2018, the entire disclosures of each of which are herein incorporated by reference for all purpose.

TECHNICAL FIELD

The present invention relates to a Global Navigation Satellite System (GNSS) receiver and a GNSS receiving method.

BACKGROUND

Conventionally, an antenna for receiving satellite radio waves which suppresses the incidence of radio waves relating to multipath has been known. For example, Japanese Utility Patent Application Publication No. Hei07-25609 discloses an antenna for receiving a satellite radio wave which does not make a reflected transmission radio wave of a low elevation angle incident thereon.

However, the configuration of above-mentioned patent document cannot completely avoid reception of signals such as multipath. Also, it is not possible to determine whether a signal received by an antenna is a signal based on a direct wave from a satellite or a signal related to multipath or the like.

Accordingly, it is an object of the present invention to provide a GNSS receiver capable of easily determining whether a GNSS signal received by an antenna is based on a direct wave from a satellite or not.

SUMMARY

The problem to be solved by the present invention is as described above, and next, a means for solving the problem and the effect thereof will be described.

According to a first aspect of the present invention, there is provided a GNSS receiver having the following configuration. That is, the GNSS receiver includes at least two antennas, a satellite direction acquisition module, an estimation module, and a determination module. The satellite direction acquisition module acquires the direction when the satellite corresponding to the GNSS signal received by the antenna is viewed from the antenna based on the satellite orbit information. The estimation module estimates the arrival direction of the GNSS signal on the basis of the difference in timing when the GNSS signal is received by the plurality of antennas. The determination module determines whether the GNSS signal received by the antenna is a direct GNSS signal based on a direct wave from the satellite or a non-line-of-sight (NLOS) GNSS signal by comparing the direction in which the satellite is viewed from the antenna with the arrival direction estimated by the estimation module.

In this configuration, it is possible to determine whether the received signal is a GNSS signal based on a direct wave from the satellite or a NLOS GNSS signal by a simple method of comparing the direction viewed from the antenna with the arrival direction of the estimated GNSS signal.

According to a second aspect of the present invention, there is provided a GNSS receiver having the following configuration. That is, the GNSS receiver includes at least two antennas, an estimation module, and a determination module. The estimation module obtains the angular spectrum of the intensity of the GNSS signal with respect to the estimation of the arrival direction of the GNSS signal on the basis of the difference in timing at which the GNSS signal is received by the plurality of antennas. The determination module determines, based on the angular spectrum obtained by the estimation module, whether the GNSS signal received by the antenna is a direct GNSS signal based on a direct wave from a satellite or an NLOS GNSS signal.

In this configuration, it is possible to determine whether the received signal is a GNSS signal based on a direct wave from the satellite or a NLOS GNSS signal by determining the angular spectrum with respect to the estimation of the arrival direction of the GNSS signal.

The GNSS receiver preferably has the following configuration. That is, the GNSS receiver is provided with a satellite direction acquisition module for acquiring a direction viewed from the antenna of a satellite corresponding to the GNSS signal received by the antenna based on satellite orbit information. The determination module determines whether the GNSS signal received by the antenna is the direct GNSS signal or the NLOS GNSS signal by using the value of the intensity of the GNSS signal corresponding to the direction viewed from the antenna of the satellite based on the angular spectrum.

In most cases, when an NLOS GNSS signal is received, the signal intensity does not increase in the direction of the satellite obtained based on the satellite orbit information. This property can be used to properly distinguish between direct GNSS signals and NLOS GNSS signals.

The GNSS receiver preferably has the following configuration. That is, the GNSS receiver is provided with a satellite direction acquisition module for acquiring a direction viewed from the antenna of a satellite corresponding to the GNSS signal received by the antenna based on satellite orbit information. The determination module determines whether the GNSS signal received by the antenna is the direct GNSS signal or the NLOS GNSS signal by comparing the direction in which the satellite is viewed from the antenna with the direction corresponding to the peak of the angular spectrum.

In most cases, the direction corresponding to the peak of the angular spectrum when receiving the NLOS GNSS signal is deviated from the direction of the satellite obtained based on the satellite orbit information. This property can be used to properly distinguish between direct GNSS signals and NLOS GNSS signals.

In the GNSS receiver, it is preferable that the determination module determines that the GNSS signal received by the antenna is the NLOS GNSS signal when the angular spectrum has a plurality of peaks.

Normally, the angular spectrum when a direct GNSS signal is received shows a distribution with a single peak in a certain direction. This property can be used to properly distinguish between direct GNSS signals and NLOS GNSS signals.

In the GNSS receiver, it is preferable that the determination module determines that the GNSS signal is the NLOS GNSS signal when the arrival directions of the GNSS signals estimated by the estimation module are similar to each other, although the plurality of GNSS signals received by the antenna indicate different source satellites. Note that the case of "The arrival directions of GNSS signals are similar to each other." includes a case where the angles of the arrival directions are similar and a case where the angle spectra are similar to each other.

The direct GNSS signals typically arrive at different angles for each satellite. On the other hand, since one or a small number of transmission sources installed by a malicious person often transmit GNSS signals by impersonating a plurality of satellites, even if the respective GNSS signals indicate different satellites, their arrival angles tend to be similar to each other. This property can be used to properly distinguish between direct GNSS signals and NLOS GNSS signals (a spoofing signal or an impersonation signal).

Preferably, the GNSS receiver is configured to output the direction of arrival estimated by the estimation module with respect to the GNSS signal determined by the determination module to be the NLOS GNSS signal.

In this configuration, for example, useful information on the multipath situation, the position of the transmission source of the spoofing signal, and the like can be obtained.

In the GNSS receiver, the NLOS GNSS signal preferably includes a multipath signal.

In this configuration, multipath can be dealt with.

The GNSS receiver preferably includes a spoofing signal as the NLOS GNSS signal.

In this configuration, GNSS spoofing can be dealt with.

The GNSS receiver preferably has the following configuration. That is, the GNSS receiver is provided with a plurality of antenna arrays constituted of the plurality of antennas. When there is a GNSS signal determined to be the NLOS GNSS signal, the GNSS receiver estimates the position of the transmission source of the spoofing signal on the basis of the result estimated by the estimation module about the arrival direction of the GNSS signal viewed from each antenna array and the position of each antenna array.

In this configuration, it is possible to know where the transmission source of the spoofing signal is located.

In the GNSS receiving apparatus, the estimation module can be configured to estimate the arrival direction of the GNSS signal from the difference in the timing of the PRN code included in the GNSS signal received by the plurality of antennas.

In this configuration, the direction of arrival of the GNSS signal can be estimated by simple processing.

In the GNSS receiver, the estimation module can also estimate the arrival direction of the GNSS signal from the phase difference of the carrier wave of the GNSS signal received by the plurality of antennas.

In this configuration, the arrival direction of the GNSS signal can be precisely estimated.

In the GNSS receiver, it is preferable that the antennas are fixedly provided so that their positions do not fluctuate with respect to the ground.

In this configuration, since the positional relationship of the plurality of antennas does not change, the arrival direction of the GNSS signal can be stably estimated.

The GNSS receiver preferably includes at least three antennas.

In this configuration, the arrival direction of the GNSS signal can be well estimated.

The GNSS receiver preferably has the following configuration. That is, the GNSS receiver includes a plurality of reception modules. The plurality of antennas are connected to any one of the plurality of reception modules. A clock signal is supplied from a common clock source to a plurality of reception modules.

In this configuration, even if the reception modules are different, the timing at which each antenna receives the GNSS signal can be expressed by using the common clock.

Therefore, the arrival direction of the GNSS signal can be estimated by accurately and easily determining the difference in the reception timing of the GNSS signal.

The GNSS receiving apparatus preferably includes an NLOS GNSS signal removal module for removing the NLOS GNSS signal from the received GNSS signal based on the determination result of the determination module.

In this configuration, the accurate operation of the apparatus can be realized by removing the NLOS GNSS signal that degrades the accuracy.

Preferably, the GNSS receiving apparatus includes a notification module for notifying the reception of the NLOS GNSS signal based on the determination result of the determination module.

In this configuration, it is possible to notify the user that the NLOS GNSS signal has been received and to call attention to the user.

According to a third aspect of the present invention, there is provided a GNSS receiver having the following configuration. That is, the GNSS receiver includes at least two antennas, an angular spectrum acquisition module, and a display data generation module. The angular spectrum acquisition module obtains the angular spectrum of the intensity of the GNSS signal on the basis of the difference in timing of receiving the GNSS signal by the plurality of antennas. The display data generation module generates data for displaying the angular spectrum.

In this configuration, the user can concretely grasp the radio wave reception state of the GNSS signal.

The GNSS receiver preferably has the following configuration. That is, the angular spectrum acquisition module obtains the angular spectrum of the intensity of the GNSS signal as a two-dimensional angular spectrum relating to the azimuth angle and the elevation angle. The display data generation module generates data for graphically displaying the angular spectrum in the celestial sphere.

In this configuration, the angular spectrum can be visually and easily understood and displayed.

In the GNSS receiver, the signal intensity in the angular spectrum to be displayed is preferably expressed by a color scale, a shade of a color or an equal intensity line.

In this configuration, it is possible to display the angular spectrum that is easy to see.

The GNSS receiver preferably has the following configuration. That is, the GNSS receiver is provided with a satellite direction acquisition module for acquiring the direction viewed from the antenna of the satellite corresponding to the GNSS signal received by the antenna based on the satellite orbit information. The display data generation module generates data for displaying the direction when the satellite is viewed from the antenna.

In this configuration, the user can understand the angular spectrum of the GNSS signal together with the direction of the satellite corresponding to the GNSS signal.

According to a fourth aspect of the present invention, the following GNSS receiving method is provided. That is, at least two antennas receive GNSS signals. A direction in which a satellite corresponding to the GNSS signal received by the antenna is viewed from the antenna is acquired based on satellite orbit information. The arrival direction of the GNSS signal is estimated on the basis of a difference in timing when the GNSS signal is received by a plurality of antennas. The direction in which the satellite is viewed from the antenna is compared with the estimated arrival direction of the GNSS signal to determine whether the GNSS signal received by the antenna is a direct GNSS signal based on a direct wave from the satellite or an NLOS GNSS signal.

According to a fifth aspect of the present invention, the following GNSS receiving method is provided. That is, at least two antennas receive GNSS signals. The angular spectrum of the intensity of the GNSS signal is obtained on the basis of the difference of the timing when the GNSS signal is received by the plurality of antennas. Based on the angular spectrum, it is determined whether the GNSS signal received by the antenna is a direct GNSS signal based on a direct wave from a satellite or an NLOS GNSS signal.

According to a sixth aspect of the present invention, the following GNSS receiving method is provided. That is, at least two antennas receive GNSS signals. The angular spectrum of the intensity of the GNSS signal is obtained on the basis of the difference of the timing when the GNSS signal is received by the plurality of antennas. Data for displaying the angular spectrum is generated.

BRIEF DESCRIPTION OF DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

DETAILED DESCRIPTION

Figure 1:
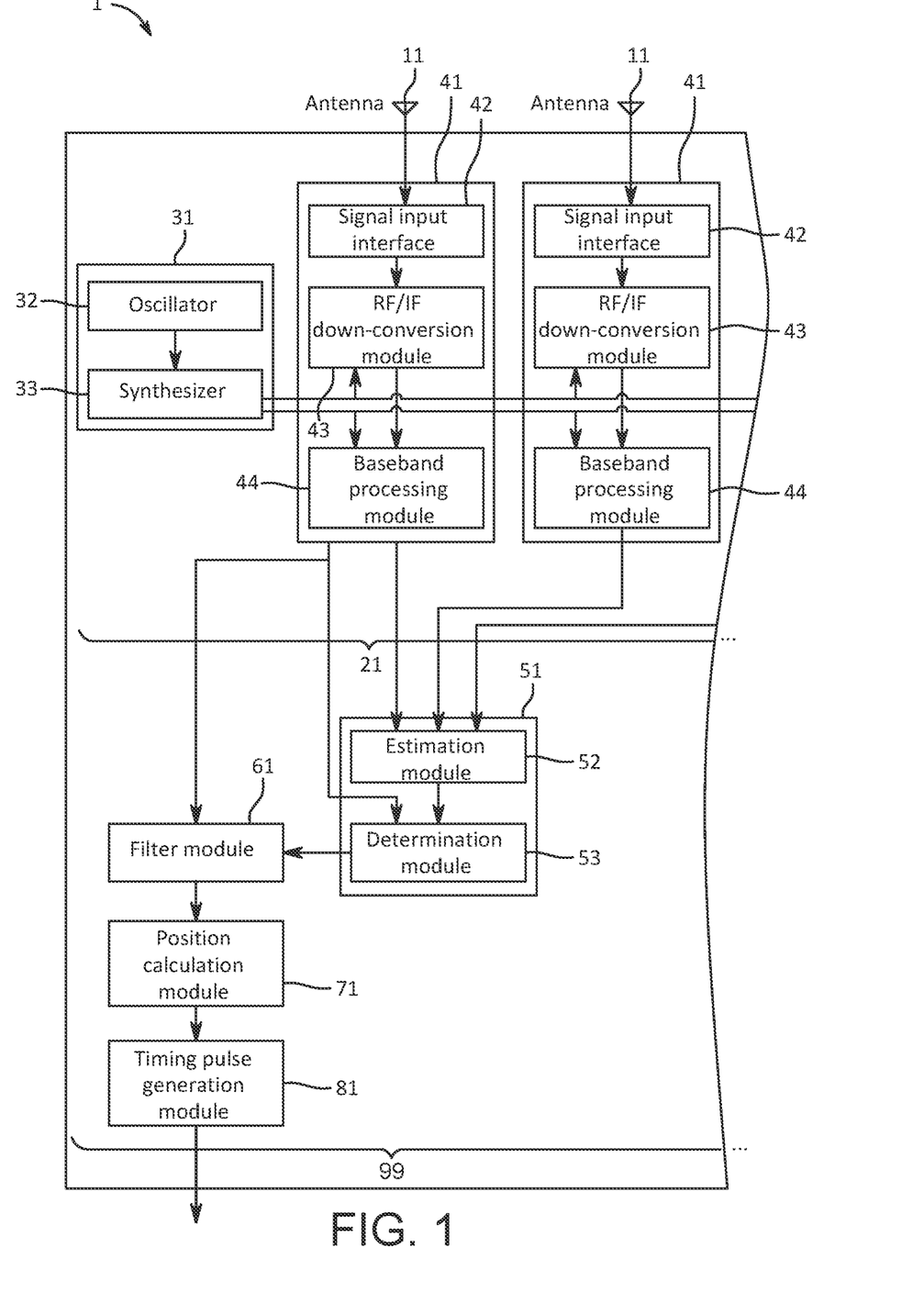
FIG. 1 is a block diagram illustrating an electrical configuration of a Global Navigation Satellite System (GNSS) receiver according to an embodiment of the present invention.
Figure 2:
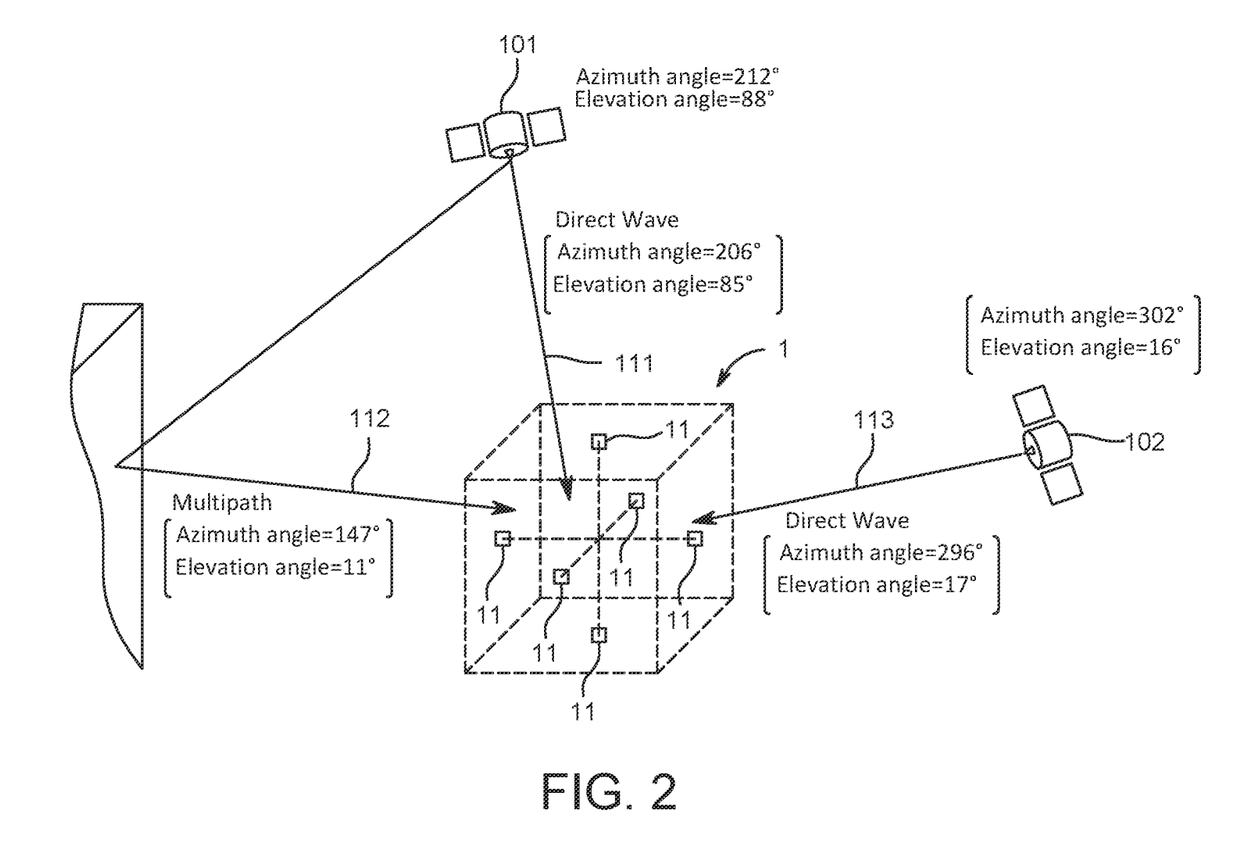
FIG. 2 shows an example of an antenna arrangement.

FIG. 1 is a block diagram showing an electrical configuration of a GNSS receiver 1 according to an embodiment of the present invention. FIG. 2 shows an example of the arrangement of the antennas 11 of the GNSS receiver 1.

The GNSS receiver 1 outputs a Pulse Per Second (1PPS) signal accurately synchronized with the GNSS time as a timing pulse based on the received GNSS signal, and can be used, for example, in a communication base station or a broadcasting station. The GNSS receiver 1 determines whether the received GNSS signal is a direct GNSS signal or a Non-line-of-sight (NLOS) GNSS signal, and performs positioning calculation by excluding the NLOS GNSS signal to output a timing pulse signal with high accuracy. As used herein, a direct GNSS signal means a GNSS signal directly receiving a radio wave transmitted from a GNSS satellite. An NLOS GNSS signal means a GNSS signal other than a direct GNSS signal. An example of the NLOS GNSS signal includes a GNSS signal (hereinafter referred to as a multi-path signal) received after a radio wave transmitted from a GNSS satellite strikes a wall surface of a building or the like and is reflected. The NLOS GNSS signal includes a GNSS signal (hereinafter referred to as a spoofing signal) which receives a radio wave transmitted from a transmission source other than the GNSS satellite by someone for the purpose of spoofing.

The GNSS receiver 1 includes an antenna array. The antenna array includes a plurality of antennas 11 capable of receiving GNSS signals. Although the configuration of each antenna 11 is arbitrary, a patch antenna, for example, is preferable in order to reduce the cost. In the antenna array, each antenna 11 is arranged at a prescribed interval and are physically arranged at different positions, therefore, the receiving timing at each antenna 11 is different except for a special case even when the same GNSS signal is received. In the present embodiment, the respective antennas 11 are fixed so as not to move with respect to the ground.

Although only two antennas 11 are shown in FIG. 1, as shown in FIG. 2, the antenna array may include six antennas 11 that are arranged so as to correspond to face center positions of 6 faces in a regular hexahedron. As shown in FIG. 2, when a first satellite 101 existing in a region of a high elevation angle as viewed from the antenna array transmits a GNSS signal, the GNSS signal 111 is received by two antennas 11 on the upper and lower surfaces of a regular hexahedron, in the order of upper and lower with a time difference. The multipath GNSS signal 112 reflected from the GNSS signal after striking from a building or the like, will be described later.

When a second satellite 102 located in a region of a low elevation angle region as viewed from the antenna array transmits the GNSS signal, the GNSS signal 113 is received by the two antennas 11 in the order of upper and lower with a time difference. However, for the second satellite 102 having a low elevation angle, the difference in the timing at which the upper and lower two antennas 11 receive the GNSS signal 113 is smaller than that of the GNSS signal 111 of the first satellite 101 having a high elevation angle. In the above description, two antennas 11 having different heights are focused on, but when four antennas 11 having different positions in a horizontal plane are focused on, the precedent and the time difference of the timing at which each antenna 11 receives the GNSS signal are different depending on the arrival direction (Azimuth and elevation angles) of the GNSS signal viewed from the antenna array.

Referring back to FIG. 1, the GNSS receiver 1 is configured to determine whether the received GNSS signal is a direct GNSS signal or an NLOS GNSS signal by using a time difference of reception timings of a plurality of antennas 11 arranged at different positions. Furthermore, the GNSS receiver 1 can generate a timing pulse signal based on the direct GNSS signal and output the timing pulse signal to the outside after excluding the NLOS GNSS signal.

The GNSS receiver 1 includes a satellite direction acquisition module 21, a decision process module 51, a filter module 61 (hereinafter also referred to as NLOS GNSS signal removal module 61), a position calculation module 71, and a timing pulse generation module 81. The satellite direction acquisition module 21, the decision process module 51, the filter module 61 (hereinafter also referred to as NLOS GNSS signal removal module 61), the position calculation module 71, and the timing pulse generation module 81 may also be implemented as "processing circuitry" 99.

The satellite direction acquisition module 21 performs signal processing on the received GNSS signal. The satellite direction acquisition module 21 includes a clock pulse generation module 31 and a reception module 41.

The clock pulse generation module 31 outputs a clock signal having a predetermined frequency (clock frequency)

to the reception module 41. The clock pulse generation module 31 functions as a clock source for supplying a clock signal to the reception module 41.

The clock pulse generation module 31 includes an oscillator 32 and a synthesizer 33.

The oscillator 32 generates a signal of a predetermined frequency by oscillating an oscillator made of, for example, crystal. The oscillator 32 outputs the generated signal to the synthesizer 33.

The synthesizer 33 generates a clock signal of a predetermined frequency (clock frequency) based on the signal output from the oscillator 32. The synthesizer 33 outputs the generated clock signal to the reception module 41.

The reception module 41 performs signal processing. In this embodiment, a reception module 41 is arranged corresponding to each antenna 11. Each reception module 41 is connected to a corresponding antenna 11. Accordingly, the GNSS signals received at each antenna 11 are processed individually by corresponding reception module 41.

Each reception module 41 includes a signal input interface 42, a Radio Frequency/Intermediate Frequency (IF) down-conversion module 43, and a baseband processing module 44.

The signal input interface 42 receives the GNSS signal received by the antenna 11. The signal input interface 42, for example, may be a connector. A signal line electrically connecting the antenna 11 and the reception module 41 is connected to the connector.

The RF/IF down-conversion module 43 converts the GNSS signal acquired by the signal input interface 42 into signal data that can be processed by the baseband processing module 44, which will be described later.

The RF/IF down-conversion module 43 includes a Voltage controlled oscillator (VCO) and a mixer. The RF/IF down-conversion module 43 mixes the GNSS signal acquired by the signal input interface 42 and the output from the VCO to match the phase of the clock frequency with the mixer. Thus, the RF/IF down-conversion module 43 can convert the frequency of the GNSS signal to an intermediate frequency that is a frequency division ratio multiple of the clock frequency.

The RF/IF down-conversion module 43 may further include an amplifier and an Analog to Digital (A/D) converter. The amplifier amplifies the GNSS signal whose frequency is converted to the intermediate frequency. The A/D converter converts the amplified GNSS signal into digital data. The RF/IF down-conversion module 43 outputs data relating to the GNSS signal to the baseband processing module 44.

The baseband processing module 44 is configured as a known computer and includes a Central Processing Unit (CPU), a Read only Memory (ROM), a correlator, and the like. The ROM stores a program for processing the GNSS signal, and the baseband processing module 44 operates based on the program.

The correlator of the baseband processing module 44 receives data relating to the GNSS signal output from the RF/IF down-conversion module 43 and a clock signal from the synthesizer 33. The correlator obtains the correlation between a plurality of kinds of Pseudorandom noise (PRN) codes, and GNSS signals while shifting the timing of the PRN codes little by little. Thus, the baseband processing module 44 specifies the PRN code number on which the GNSS signal is modulated, and specifies the reception timing of the PRN code.

Although the GNSS system is constructed by many GNSS satellites, the PRN code is unique to each GNSS satellite. Thus, identifying the PRN code number is synonymous with identifying the GNSS satellite corresponding to the received GNSS signal.

By specifying the reception timing of the PRN code, the reception timing of the GNSS signal can be obtained. To specify the reception timing of the PRN code, the clock signal input from the clock pulse generation module 31 to the correlator is used as a reference.

The baseband processing module 44 performs arithmetic processing by the CPU to data inputted to the correlator. Thus, the GNSS signal modulated based on the PRN code can be demodulated.

The baseband processing module 44 calculates the position information of the satellite by using the navigation message included in the demodulated data. The position information of the satellites can be obtained by using a known calculation formula based on the orbit information (satellite orbit information) of each GNSS satellite included in the navigation message and the GNSS time. The GNSS time can be obtained by performing positioning calculation by a normal method.

The baseband processing module 44 calculates information of a direction (Specifically, azimuth angle and elevation angle) in which a GNSS satellite corresponding to the received GNSS signal is viewed from an antenna array on the basis of the position of the GNSS satellite corresponding to the GNSS signal and the position of the antenna 11 obtained by positioning calculation. More specifically, referring to the example shown in FIG. 2, the baseband processing module 44 can calculate, for example, that the first satellite 101 is located in a direction having an azimuth angle of 212° and an elevation angle of 88°, when viewed from the antenna array.

Referring back to FIG. 1, the baseband processing module 44 outputs data regarding the azimuth and elevation angles of the first and second satellites 101 and 102 as viewed from the antenna array and data acquired regarding the reception timing of the GNSS signal to the decision process module 51 and the determination module 53. The baseband processing module 44 outputs the obtained GNSS signal to the filter module 61.

The decision process module 51 determines whether the received GNSS signal is a direct GNSS signal or an NLOS GNSS signal based on data inputted from the reception module 41. The decision process module 51 includes an estimation module 52 and a determination module 53.

The estimation module 52 estimates the arrival direction of the received GNSS signal based on the reception timing of the PRN code acquired by the reception module 11 corresponding to the six antennas 11 and the positional relation of the six antennas 11.

Referring back to FIG. 2, six antennas 11 are arranged in three pairs so as to form a pair with each other across the center of a regular hexahedron. As described above, when the pair of two antennas 11 receive the same GNSS signal, a time difference in reception timing occurs, and the time difference is different depending on the arrival direction of the GNSS signal.

To briefly describe the method of estimating the arrival direction, it is assumed that the angle formed by the arrival direction of the GNSS signal with respect to the plane perpendicular to the virtual straight line connecting the pair of two antennas 11 is θ, the path difference of the GNSS signal can be expressed as d sin θ, where d is the interval between the two antennas 11. Therefore, the difference Δt of the reception timing of the GNSS signal can be expressed by Δt=d sin θ/c, where c is the speed of light. This equation shows that the angle θ can be obtained from the difference Δt of the reception timing.

As shown in FIG. 2, the three pairs of antennas 11 are arranged in different directions represented by the virtual straight line connecting the paired antennas 11. In the example of FIG. 2, the three pairs are shown to be orthogonal to each other. Therefore, the directions of arrival of the GNSS signals can be specified three-dimensionally by determining the angles θ of the remaining two pairs of antennas 11.

An example of the arrival direction of the GNSS signal estimated by the estimation module 52 is explained with reference to FIGS. 1 and 2. In the example of FIG. 2, the estimation module 52 estimates that the GNSS signal 111 arrived from a direction in which the azimuth angle is 206°, and the elevation angle is 85°. The GNSS signal 112 is estimated to have arrived from a direction having an azimuth angle of 147° and an elevation angle of 11°. The GNSS signal 113 is estimated to have arrived from a direction having an azimuth angle of 296° and an elevation angle of 17°. The estimation module 52 outputs data relating to the arrival direction of the estimated GNSS signal to the determination module 53.

For each GNSS signal, the determination module 53 compares the azimuth angle and elevation angle indicating the arrival direction of the GNSS signal estimated by the estimation module 52 with the azimuth angle and elevation angle obtained from the navigation message by the baseband processing module 44 for the satellite corresponding to the GNSS signal, and determines whether or not they match.

Thus, the determination module 53 can determine whether the received GNSS signal is a direct GNSS signal based on a direct wave from the satellite or an NLOS GNSS signal.

Specifically, the determination module 53 compares the azimuth angle and elevation angle indicating the arrival direction of the GNSS signal acquired from the estimation module 52 with the azimuth angle and elevation angle based on the position of the satellite acquired from the navigation message. When both the difference in azimuth angle and the difference in elevation angle are within a predetermined range, the determination module 53 determines that the received GNSS signal is a direct GNSS signal. When at least one of the azimuth angle difference and the elevation angle difference is out of a predetermined range, the determination module 53 determines that the received GNSS signal is an NLOS GNSS signal.

As shown in FIG. 2, when the GNSS signal 111 transmitted by the satellite 101 is directly received by the antenna array, the arrival direction of the GNSS signal 111 coincides with the azimuth angle and the elevation angle of the first satellite 101. On the other hand, since the GNSS signal 112 based on the multipath changes its direction by reflection, the direction of arrival of the GNSS signal is in most cases substantially different from the azimuth angle and the elevation angle of the first satellite 101. Therefore, by comparing the directions, the determination module 53 can determine that the GNSS signal 111 is a direct GNSS signal and the GNSS signal 112 is an NLOS GNSS signal.

Although spoofed GNSS signals are omitted in FIG. 2, the location of the source transmitting the spoofed GNSS signals is usually different from the location of the satellite intended to spoofed. Therefore, the determination module 53 can determine that the GNSS signal received from such a transmitting device is an NLOS GNSS signal by comparing directions in exactly the same manner as described above.

The decision process module 51 outputs the determination result of the determination module 53 to the filter module 61.

The filter module 61 receives GNSS signals from the baseband processing module 44 of one reception module 41, and also receives a determination result from the decision process module 51. The filter module 61 selectively removes a signal determined as an NLOS GNSS signal by the determination module 53 from the GNSS signal input from the reception module 41. The GNSS signal generated after the filter processing becomes only the direct GNSS signal. The filter module 61 outputs the GNSS signal after the filter processing to the position calculation module 71.

The position calculation module 71 performs a known positioning calculation based on the GNSS signal input from the filter module 61. As a result, GNSS time is obtained. The position calculation module 71 outputs the obtained GNSS time to a timing pulse generation module 81.

The timing pulse generation module 81 generates a pulse signal of 1 time per second (1 PPS signal) synchronized with the GNSS time based on the GNSS time inputted from the position calculation module 71. The timing pulse signal generated by the timing pulse generation module 81 is output from the GNSS receiver 1 and input to an external device such as a reference frequency generator.

The GNSS receiver 1 determines whether a received GNSS signal is a direct GNSS signal or an NLOS GNSS signal, performs positioning calculation excluding an NLOS GNSS signal reducing positioning accuracy, and generates a timing pulse. Therefore, the effect of the multipath and the spoofing signal can be avoided, and the accurate timing pulse can be stably outputted.

The reception timing of the GNSS signal is specified in the plurality of reception modules 41, and the plurality of reception modules 41 are supplied with a common clock signal from a single clock pulse generation module 31. Therefore, since the plurality of reception modules 41 can represent the reception timing with a common reference, the estimation module 52 can accurately and easily obtain the time difference of the reception timing.

The GNSS receiving device 1 is not limited to the application for generating a timing pulse. For example, it can be suitably used not only for navigation using a positioning result outputted from the GNSS receiver 1 but also for various other purposes.

The number and arrangement of the antennas 11 constituting the antenna array can be variously changed. In the antenna array of FIG. 2, the antenna 11 may be further disposed at a body center position of a regular hexahedron. Alternatively, instead of arranging the antennas 11 three-dimensionally at different heights, an appropriate number of antennas can be arranged side by side so as to form a polygon in a horizontal plane.

When considering a combination of arbitrarily selecting two antennas 11 from the antennas 11 constituting the antenna array, it is preferable that three or more virtual straight lines connecting the two antennas 11 can be defined so that their directions are different from each other. Thus, the arrival direction of the GNSS signal can be easily specified three-dimensionally. The antenna array described in FIG. 2 also satisfies this condition, but as the simplest antenna array satisfying this condition, a configuration in which three antennas 11 are arranged so as to form a triangle is conceivable.

The antenna array may be composed of two antennas 11. In this case, the arrival direction of the GNSS signal cannot be estimated at a pin point, but the arrival direction should be a bus bar of a conical surface having the position of the antenna array as a vertex and a virtual straight line connecting the 2 antennas 11 as an axis. The angle formed by the bus of the conical surface with the imaginary straight line (axis) is equal to 90° minus the angle θ described above. In this manner, the estimation module 52 may estimate the arrival direction of the GNSS signal so as to narrow it to a certain range. The determination module 53 can be configured to determine that the GNSS signal is an NLOS GNSS signal when the direction in which the GNSS satellite corresponding to the GNSS signal is viewed from the antenna array is deviated from the conical surface by a predetermined distance or more.

It is also possible to determine whether the GNSS signal is a direct GNSS signal or an NLOS GNSS signal based on the order of reception by the antennas 11 without evaluating the time difference of reception timing by the plurality of antennas 11. For example, using the antenna array of FIG. 2, if the southern antenna 11 receives the GNSS signal earlier than the northern antenna, the estimation module 52 estimates that the direction of arrival of the GNSS signal is generally south. When the direction in which the GNSS satellite corresponding to the GNSS signal is viewed from the antenna array is north contrary to the estimation result of the estimation module 52, the determination module 53 determines that the GNSS signal is an NLOS GNSS signal.

Referring back to FIG. 1, the GNSS receiver 1 estimates the arrival direction of the GNSS signal by using the reception time difference of the PRN code when the GNSS signal is received by the two antennas 11. However, instead of the time difference of the PRN code, the carrier wave phase difference of the GNSS signal can be used to estimate the arrival direction of the GNSS signal. In this case, the direction of arrival of the GNSS signal can be precisely estimated. Since, the phase is an angular representation of time, the carrier phase difference is a kind of difference in the reception timing of the GNSS signal.

As described above, the GNSS receiver 1 includes at least two antennas 11, the baseband processing module 44, the estimation module 52, and the determination module 53. The baseband processing module 44 acquires the direction in which the satellite 101, 102 corresponding to the GNSS signal received by the antenna 11 is viewed from the antenna 11 based on the satellite orbit information. The estimation module 52 estimates the arrival direction of the GNSS signal 111, 112 and 113 on the basis of the difference Δt between the timings at which the GNSS signal is received by the plurality of antennas 11. The determination module 53 compares the direction in which the satellite 101,102 is viewed from the antenna with the arrival direction estimated by the estimation module 52, and determines whether the GNSS signal (111,112,113) received by the antenna 11 is a direct GNSS signal based on a direct wave from the satellite (101,102) or an NLOS GNSS signal.

Thus, it is possible to determine whether the received GNSS signal is a direct GNSS signal or an NLOS GNSS signal based on a simple method for comparing the estimated arrival direction of the GNSS signal 111,112,113 with the direction of the satellite 101, 102 as viewed from the antenna 11.

The estimation module 52 may be configured to determine the angular spectrum of the intensity of the GNSS signal based on the difference Δt between the reception timings of the GNSS signal at the plurality of antennas 11. The angular spectrum can be calculated using known methods such as the minimum norm method, the linear prediction method, the Multiple Signal Classification (MUSIC) method, and the like. The angular spectrum may be obtained based on the difference in the timing of the PRN code included in the GNSS signal, or may be obtained from the phase difference of the carrier wave of the GNSS signal. However, it is preferable to use the phase difference of the carrier wave because a highly accurate angular spectrum can be obtained.

Normally, the closer a certain direction is to the arrival direction of the GNSS signal, the stronger the signal strength in that direction should be. Thus, determining the angular spectrum of the intensity of the GNSS signal is substantially the same as determining the distribution of correctness when a direction is assumed to be the arrival direction of the GNSS signal.

The angular spectrum may be a one-dimensional spectrum relating to either the azimuth angle or the elevation angle, but preferably a two-dimensional spectrum relating to both.

Figure 3A:
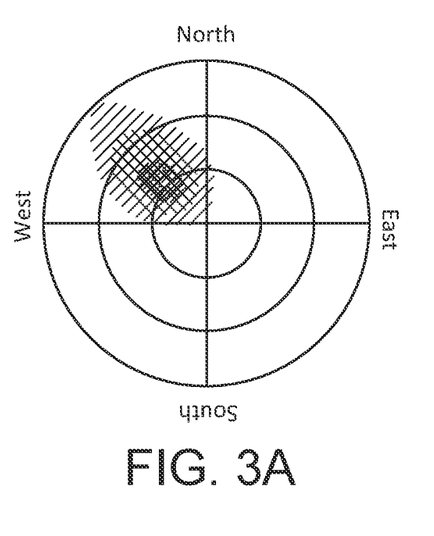
FIGS. 3A and 3B show examples of an angular spectrum of the intensity of the GNSS signal.
Figure 3B:
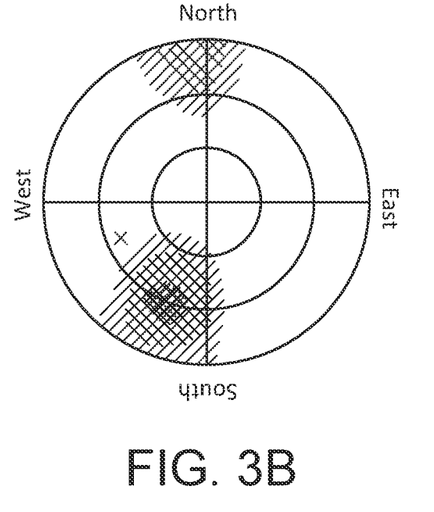

FIGS. 3A and 3B show examples of the angular spectrum determined by the estimation module 52 of FIG. 1. In FIGS. 3A and 3B, a two-dimensional angular spectrum is arranged on the inner surface of a virtual sphere (celestial sphere) centered on the antenna array, and the celestial sphere is looked up from the point of the antenna array. The angle from the center of the circle corresponds to the azimuth angle in the direction of arrival of the GNSS signal. The outermost circle corresponds to an elevation angle of 0° in the arrival direction, and the center of the circle corresponds to an elevation angle of 90° in the arrival direction. For convenience of illustration, in the angular spectrum of FIGS. 3A and 3B, the signal intensity is represented by the spacing of the hatches. The narrow hatched areas indicate high signal strength, wide hatched areas indicate low signal strength, and unhatched areas indicate substantially zero signal strength.

By determining the angular spectrum as described above, the determination module 53 can determine the direct GNSS signal and the NLOS GNSS signal, for example, as follows. A plurality of the following four determination methods may be combined. Further, the determination method may be switched according to the accuracy required in the positioning operation or the like.

First, the signal intensity corresponding to the direction of the satellite calculated by the baseband processing module 44 is obtained by using the angular spectrum, and if the signal intensity is not less than a predetermined intensity, the determination module 53 determines that the signal is a direct GNSS signal, and otherwise determines that the signal is an NLOS GNSS signal.

In FIGS. 3A and 3B, the direction of the satellite calculated by the baseband processing module 44 is indicated by an X. In the case of FIG. 3A, the signal intensity at the position corresponding to the mark X is large, and in the case of FIG. 3B, the signal intensity at the position corresponding to the mark X is zero. Therefore, the determination module 53 determines that the GNSS signal of FIG. 3A is a direct GNSS signal, and determines that the GNSS signal of FIG. 3B is an NLOS GNSS signal.

Second, the direction corresponding to the peak of the signal intensity in the angular spectrum is determined, and this direction is compared with the direction of the satellite calculated by the baseband processing module 44, and if the difference in direction is within a predetermined range, the determination module 53 determines that the signal is a direct GNSS signal, and if not, it determines that the signal is an NLOS GNSS signal.

In the case of FIG. 3B, the direction in which the signal intensity is the largest in the angular spectrum is slightly different from the direction of the satellite (cross) calculated by the baseband processing module 44. Therefore, the determination module 53 determines that the GNSS signal shown in FIG. 3B is an NLOS GNSS signal.

Third, when there are a plurality of peaks of signal intensity in the angular spectrum, the possibility that there are a plurality of transmission sources and the possibility of multipath is suspected, so that the determination module 53 determines that the signal is an NLOS GNSS signal.

In FIG. 3B, peaks appear in both the south and north directions in the angular spectrum. Therefore, the determination module 53 determines that the GNSS signal shown in FIG. 3B is an NLOS GNSS signal.

Fourth, the angle spectra of the GNSS signals representing a plurality of satellites (In other words, the GNSS signals that are spread coded with different PRN codes) are compared, and if they are similar to each other, the determination module 53 determines that they are NLOS GNSS signals. That is, when a malicious person transmits a spoofing signal in order to mislead the current position of the mobile body to a specific position, it is necessary to transmit the GNSS signal to the mobile body by spoofing a plurality of different satellites. On the other hand, since most of the facilities for transmitting the spoofing signal are one or a few, the spoofing signal is transmitted from a small number of places. Therefore, even if the spoofing signal is a GNSS signal indicating a plurality of different satellites, the angular spectra thereof tend to be similar to each other. Thus, it is possible to appropriately determine whether or not the received GNSS signal is an NLOS GNSS signal (In particular, whether it is a spoofing signal or not).

One countermeasure for spoofing signals is the need to locate the source of such signals. In this regard, for example, if a plurality of antenna arrays having the configuration shown in FIG. 2 are provided, the antenna arrays are arranged at a distance from each other, and the arrival direction of the spoofing signals received in the respective antenna arrays is estimated, the position of the transmission source can be known by a known geometric calculation.

Figure 4:
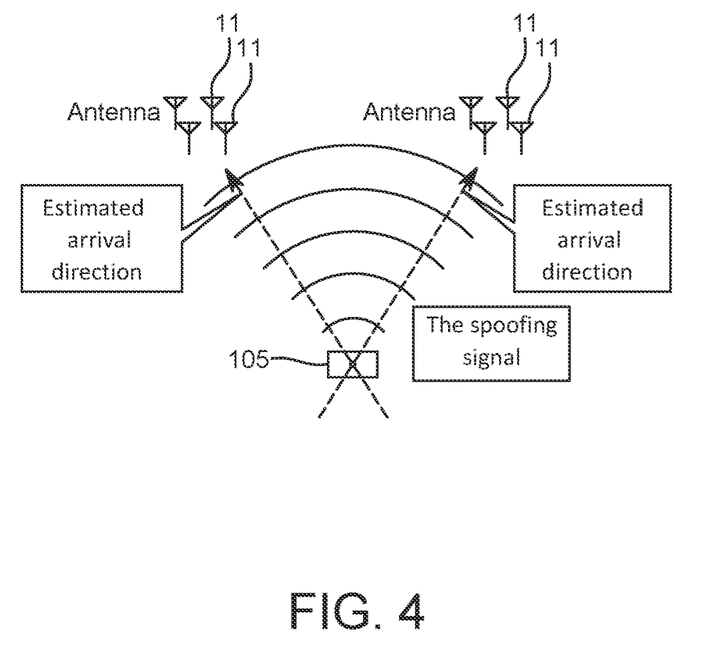
FIG. 4 is a schematic diagram for obtaining the location of a spoofing signal transmitter using a plurality of antenna arrays.

FIG. 4 shows a conceptual diagram for obtaining the position of a GNSS spoofer 105, in accordance with an embodiment of the present disclosure. The GNSS spoofer 105 is hereinafter referred to as a spoofing attacker or a malicious transmitter 105, which is the transmission source of the spoofing signal, by using a plurality of antenna arrays. The estimation of the arrival direction of the spoofing signal can be realized, for example, by obtaining a direction corresponding to the peak of the angular spectrum calculated in each antenna array.

In FIG. 4, it can be estimated that the GNSS spoofer 105 exists at a point where a straight line extending in the opposite direction of the arrival direction of the spoofing signal intersects. Although a plurality of antenna arrays may be provided, the number of antenna arrays is preferably large in order to obtain the position of the transmission source with high accuracy.

Referring back to FIG. 1, in the GNSS receiver 1, the estimation module 52 can be configured to obtain the angular spectrum of the intensity of the GNSS signal with respect to the estimation of the arrival direction of the GNSS signal, based on the difference in the timing at which the GNSS signal is received by the plurality of antennas 11. The determination module 53 determines whether the GNSS signal received by the antenna 11 is a direct GNSS signal or an NLOS GNSS signal on the basis of the angular spectrum determined by the estimation module 52.

Thus, by determining the distribution of the certainty of the estimation of the arrival direction of the GNSS signal as the angular spectrum, it is possible to determine whether the received GNSS signal is a GNSS signal based on a direct wave from the satellite or not.

The angular spectrum is not limited to the use of estimating the direction of arrival of the GNSS received signal, but may be calculated for the purpose of simply displaying the signal for monitoring, for example.

Figure 5:
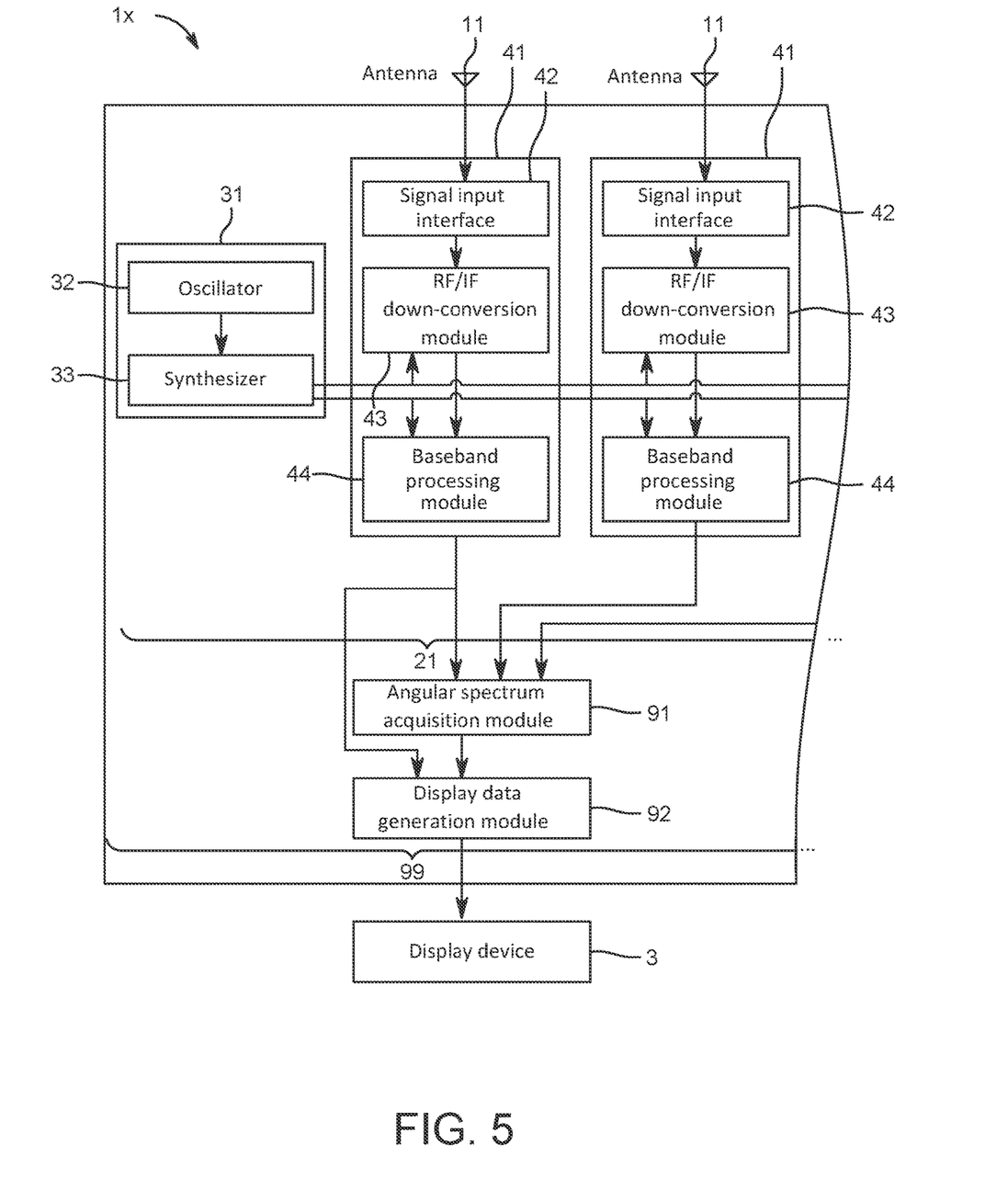
FIG. 5 is a block diagram illustrating an electrical configuration of a GNSS receiver according to another embodiment of the present invention.

FIG. 5 illustrates the GNSS receiver 1x, in accordance with another embodiment of the present disclosure. In the GNSS receiver 1x, a decision process module 51, the filter module 61, the position calculation module 71, and the timing pulse generation module 81 are omitted.

The GNSS receiver 1x includes an angular spectrum acquisition module 91 and a display data generation module 92. The satellite direction acquisition module 21, the angular spectrum acquisition module 91 and the display data generation module 92 may also be implemented as "processing circuitry" 99.

The angular spectrum acquisition module 91 calculates and acquires the angular spectrum of the intensity of the GNSS signal for each satellite number (In other words, for each PRN code number) based on the phase difference of the carrier wave of the GNSS signal of each satellite obtained from the baseband processing module 44. Since, the operation of the angular spectrum acquisition module 91 is exactly the same as that of the estimation module 52 of FIG. 1 for calculating the angular spectrum, a detailed description thereof is omitted.

The display data generation module 92 generates display data for displaying the angular spectrum obtained by the angular spectrum acquisition module 91 on a display device 3 connected to the GNSS receiver 1x. The display device 3 is configured as a liquid crystal display, for example, and can display various information.

It is conceivable that, for example, contents equivalent to those shown in FIGS. 3A and 3B are displayed on the display device 3. Thus, by graphically displaying the angular spectrum arranged on the celestial sphere with the antenna array as the center on the display device 3, the user can intuitively understand the reception state of the GNSS signal.

The display data generated by the display data generation module 92 preferably includes, in addition to the angular spectrum, display data for displaying the satellite direction calculated by the baseband processing module 44 as a sky plot, as indicated by an X in FIG. 3B. Thus, the user can understand the angular spectrum together with the direction of the satellite corresponding to the GNSS signal.

As shown in FIG. 3A, the display device 3 can display an angular spectrum focused on 1 satellite number corresponding to one PRN code. However, the display device 3 can display a list of a large number of angle spectra for each satellite number.

The expression of the angular spectrum is not limited to the expression in the circular region using the celestial sphere as shown in FIG. 3A, but can be expressed, for example, in a rectangular region with the horizontal axis as the azimuth angle and the vertical axis as the elevation angle. The distribution of the signal intensity in the angular spectrum displayed on the display device 3 may be expressed by a color scale such as thermography, may be expressed by a shade of a color, or may be expressed by an equal intensity line.

Although the preferred embodiments and modifications of the present invention have been described above, the above-described configuration can be changed, for example, as follows.

The antenna 11 constituting the antenna array need not be fixed to the ground. For example, the antenna array may be provided on a mobile body such as an automobile and a ship.

The satellite orbit information may not be acquired from the GNSS signal transmitted from the satellite. For example, the GNSS receivers 1 and 1x may be configured to be connected to the Internet, and the reception module 41 may acquire satellite orbit information from GNSS assist data distributed through the Internet.

When the baseband processing module 44 obtains an azimuth angle and an elevation angle when the satellite is viewed from the antenna array, information on the position of the antenna array including the location of the antennas 11, is required as a premise. When the antenna array is fixed to the ground, the position of the antenna array can be determined in advance. Therefore, the baseband processing module 44 can use a position set by the user in advance without determining the position of the antenna array by positioning calculation.

The reception module 41 capable of connecting two or more antennas 11 per piece may be used. In this case, the GNSS receiver 1 may include, for example, six antennas 11 and three reception modules 41, and it is preferable that clock signals are supplied to the three reception modules 41 from the ecommon clock pulse generation module 31. All the antennas 11 constituting the array antenna may be connected to one reception module 41.

The GNSS receiver 1 may be provided with a notification module that notifies reception of an NLOS GNSS signal instead of or in addition to the filter module 61. In this case, it is possible to notify the user that the NLOS GNSS signal has been received and to call attention to the user. The configuration of the notification module is not particularly limited. The notification module can be, for example, a buzzer for notifying by utilizing sound. The notification module can be a display device for displaying a warning.

As shown in FIG. 2, the arrival directions of GNSS signals representing a plurality of different satellites are estimated by pinpoints, and when the difference in the angle of the estimated arrival directions is not more than a predetermined value. In other words, when the directions of arrival are similar to each other, the determination module 53 may determine that the GNSS signals are NLOS GNSS signals (spoofing signal).

With respect to the GNSS signal determined by the determination module 53 to be an NLOS GNSS signal, the GNSS receiver 1 may output the arrival direction of the GNSS signal estimated by the estimation module 52 to an appropriate display device. In this case, it is possible to obtain useful information such as how multipath occurs and from which direction the spoofing signal is transmitted.

The GNSS receiver 1 of FIG. 1 may include the display data generation module 92 of FIG. 5, and may have a function of displaying the angular spectrum on the display device 3.

The GNSS receivers 1 and 1x may be integrally provided with the display device 3.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A Global Navigation Satellite System (GNSS) receiver comprising:
    at least two antennas including a first antenna and a second antenna configured to receive a plurality of GNSS signals; and
    processing circuitry configured to estimate a plurality of arrival directions respectively corresponding to the plurality of GNSS signals, wherein
    to estimate a given arrival direction corresponding to a given GNSS signal among the plurality of arrival directions respectively corresponding to the plurality of GNSS signals, the processing circuitry is configured to:
        acquire, based on satellite orbit information, a direction, viewed from the at least two antennas, of a satellite corresponding to the given GNSS signal received by the at least two antennas; and
        estimate the given arrival direction of the given GNSS signal by determining a phase difference of a carrier wave of the given GNSS signal, or by determining a difference between a first timing when a Pseudorandom noise (PRN) code included in the given GNSS signal is received by the first antenna, and a second timing when the PRN code included in the given GNSS signal is received by the second antenna, and
    the processing circuitry is further configured to:
        determine whether the plurality of GNSS signals received by the at least two antennas indicate different source satellites;
        determine whether the plurality of arrival directions of the plurality of GNSS signals estimated by the processing circuitry are similar to each other by determining whether angular spectra of the plurality of GNSS signals are similar to each other, wherein the angular spectra are determined by measuring signal strengths at a range of angles of arrival; and
        determine that the GNSS signal is a non-line-of-sight (NLOS) GNSS signal when the plurality of arrival directions are similar to each other although the plurality of GNSS signals received by the at least two antennas indicate different source satellites.

2. A Global Navigation Satellite System (GNSS) receiver comprising:
    at least two antennas including a first antenna and a second antenna configured to receive a plurality of GNSS signals; and
    processing circuitry configured to:
        for each GNSS signal of the plurality of GNSS signals, estimate an arrival direction of the GNSS signal based on a difference between a first timing at which the GNSS signal is received by the first antenna, and a second timing at which the GNSS signal is received by the second antenna, so as to estimate a plurality of arrival directions of the plurality of GNSS signals;

determine whether the plurality of GNSS signals received by the at least two antennas indicate different source satellites;

determine whether the plurality of arrival directions of the plurality of GNSS signals estimated by the processing circuitry are similar to each other by determining whether angular spectra of the plurality of GNSS signals are similar to each other, wherein the angular spectra are determined by measuring signal strengths at a range of angles of arrival; and determine that the plurality of GNSS signals are non-line-of-sight (NLOS) GNSS signals when the plurality of arrival directions of the plurality of GNSS signals estimated by the processing circuitry are similar to each other although the plurality of GNSS signals received by the at least two antennas indicate different source satellites.

3. The GNSS receiver according to claim 1, wherein:
the GNSS receiver is characterized to output the direction of arrival estimated by the processing circuitry with respect to the GNSS signal determined by the processing circuitry as the NLOS GNSS signal.

4. The GNSS receiver according to claim 1, wherein:
the NLOS GNSS signal includes a multipath signal.

5. The GNSS receiver according to claim 1, wherein:
the NLOS GNSS signal includes a spoofing signal.

6. The GNSS receiver according to claim 5, further comprising:
a plurality of antenna arrays, each comprising a plurality of antennas, one of the plurality of antenna arrays comprising the at least two or more antennas, wherein
the GNSS receiver is characterized to estimate a position of a transmission source of the spoofing signal based on the estimated arrival direction of the GNSS signal viewed from each antenna array and a position of each antenna array, when there is a GNSS signal determined by the processing circuitry as the NLOS GNSS signal.

7. The GNSS receiver according to claim 1, wherein:
the at least two antennas are fixedly provided with respect to the ground.

8. The GNSS receiver according to claim 1, wherein:
the GNSS receiver includes at least three antennas.

9. The GNSS receiver according to claim 1, further comprising:
a plurality of reception modules; and
the at least two antennas, each connected to any one of the plurality of reception modules, wherein:
the GNSS receiver is characterized in that a clock signal is supplied from a common clock source to the plurality of reception modules.

10. The GNSS receiver according to claim 1, wherein the processing circuitry is further configured to remove the NLOS GNSS signal from the received GNSS signal based on the determination result of the processing circuitry.

11. The GNSS receiver according to claim 1, wherein the processing circuitry is further configured to notify the reception of the NLOS GNSS signal based on the determination result of the processing circuitry.

12. The GNSS receiver according to claim 2, wherein the processing circuitry is further configured to:
determine values of intensity of the GNSS signal at the plurality of arrival directions; and
generate data for displaying the GNSS signal and the values of intensity of the GNSS signal at the plurality of arrival directions as an angular spectrum.

13. The GNSS receiver according to claim 12, wherein
the angular spectrum is a two-dimensional angular spectrum relating to an azimuth angle and an elevation angle, and
to generate data for graphically displaying the angular spectrum of the determined values of intensity in a celestial sphere.

14. A Global Navigation Satellite System (GNSS) receiving method, comprising:
receiving a plurality of GNSS signals by at least two antennas including a first antenna and a second antenna;
for each GNSS signal of the plurality of GNSS signals, estimating an arrival direction of the GNSS signal based on a difference between a first timing at which the GNSS signal is received by the first antenna and a second timing at which the GNSS signal is received by the second antenna, so as to estimate a plurality of arrival directions of the plurality of GNSS signals;
determining whether the plurality of GNSS signals received by the at least two antennas indicate different source satellites;
determining whether the plurality of estimated arrival directions of the plurality of GNSS signals are similar to each other by determining whether angular spectra of the plurality of GNSS signals are similar to each other, wherein the angular spectra are determined by measuring signal strengths at a range of angles of arrival; and
determining that the plurality of GNSS signals are non-line-of-sight (NLOS) GNSS signals when the plurality of estimated arrival directions of the plurality of GNSS signals are similar to each other although the plurality of GNSS signals received by the at least two antennas indicate different source satellites.

* * * * *